(No Model.) 2 Sheets—Sheet 1.
E. K. HAYES.
DEVICE FOR LAYING AND TAKING UP CORN PLANTER CHECK ROW LINES.
No. 358,354. Patented Feb. 22, 1887.
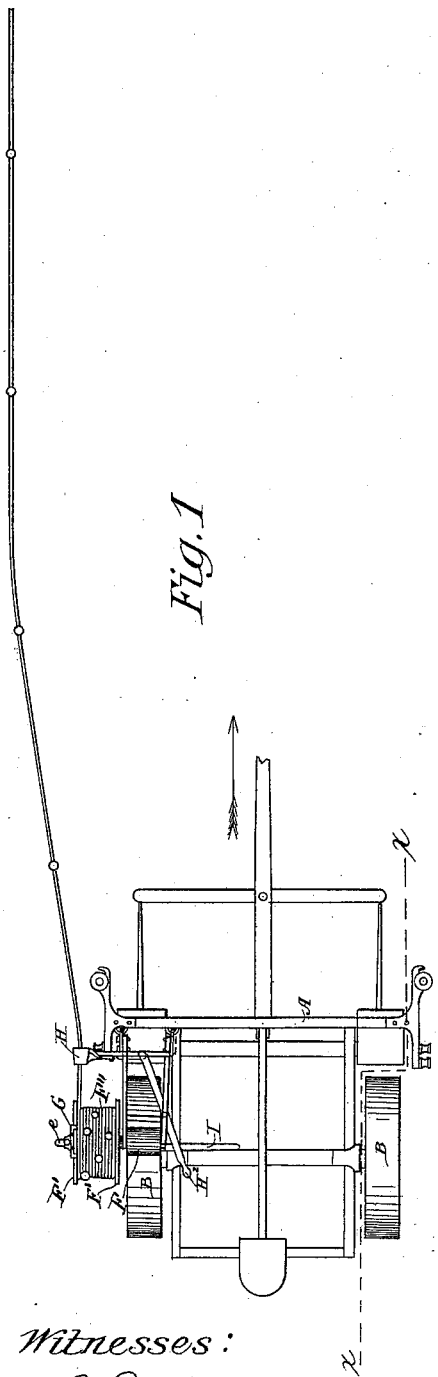
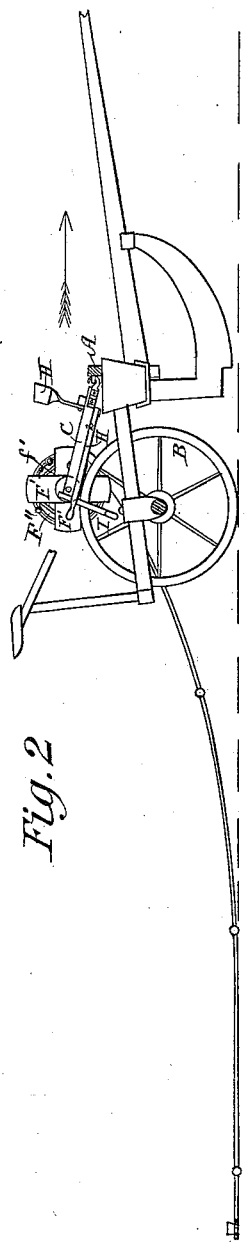
Witnesses:
J. R. Richards.
A. Johnson.
Inventor:
Eugenio K. Hayes,
By W. B. Richards,
Attorney.

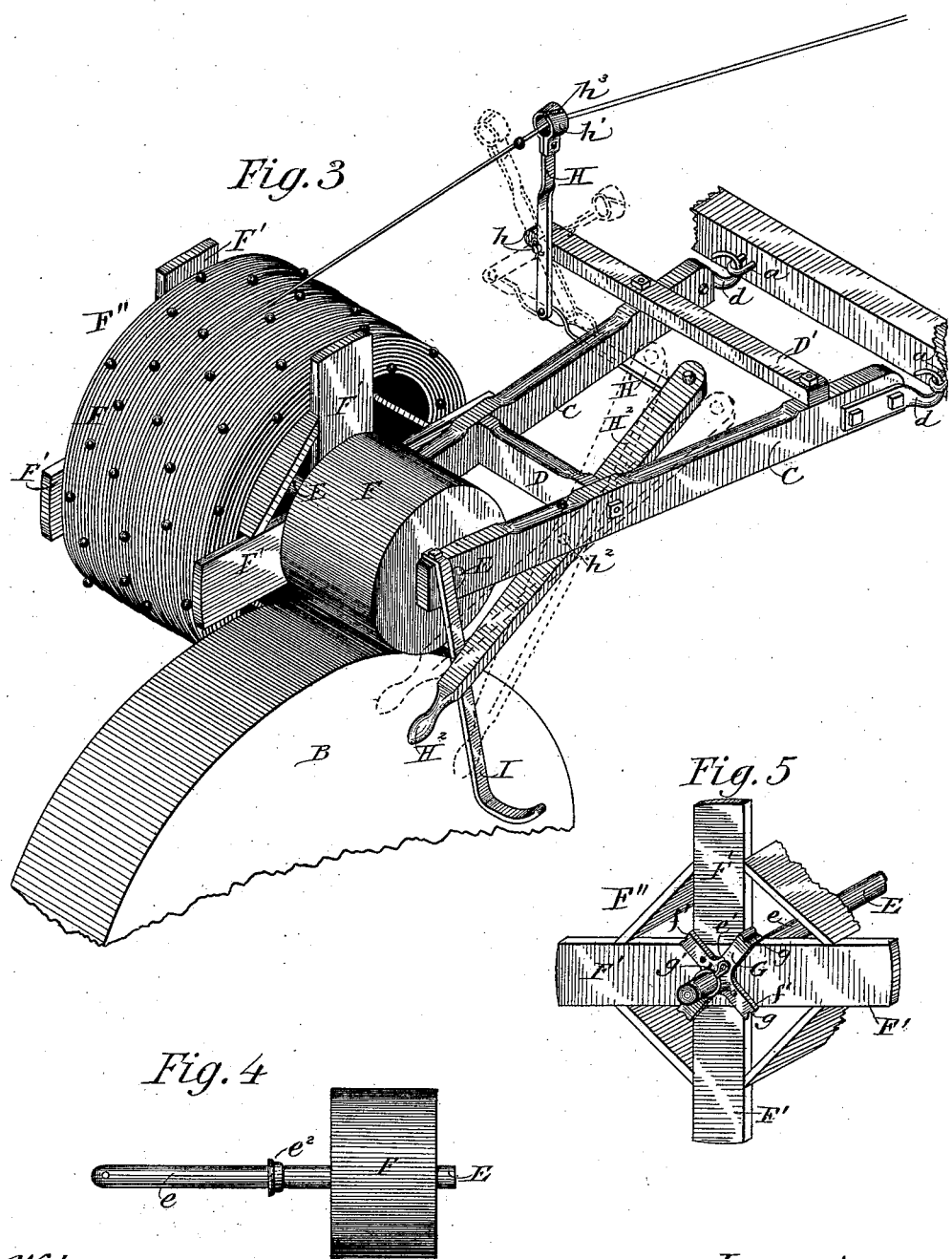

UNITED STATES PATENT OFFICE.

EUGENIO K. HAYES, OF GALVA, ILLINOIS.

DEVICE FOR LAYING AND TAKING UP CORN-PLANTER CHECK-ROW LINES.

SPECIFICATION forming part of Letters Patent No. 358,354, dated February 22, 1887.

Application filed December 3, 1886. Serial No. 220,510. (No model.)

*To all whom it may concern:*

Be it known that I, EUGENIO K. HAYES, a citizen of the United States, residing at Galva, in the county of Henry and State of Illinois, have invented certain new and useful Improvements in Devices for Laying and Taking up Corn-Planter Check-Row Lines, of which the following is a specification.

My invention relates to devices for laying and taking up check-row wires, used for operating corn-planters in a well-known manner.

The improvement consists, generally, in a novel mode of suspending a swinging frame, upon which the reel is supported, by hinges attached directly to the bar which carries the check-row devices; in providing a guide arranged in advance of the reel; means for operating the guide to direct the wire properly to the reel in winding the same thereon by the forward movement of the machine, and in a simple means for securing the reel to the shaft of the swinging frame, as will hereinafter more fully appear.

In the accompanying drawings, Figure 1 is a plan of a corn-planter with my improvement attached in position to take up the check-row wire from the field; Fig. 2, a sectional side elevation of a corn-planter, in the line $xx$ in Fig. 1, with my improvement attached in position to unreel or lay the wire across the field; Fig. 3, a perspective of my improved device in working position to lay the wire, showing a fragmental part of the check-row bar and wheel, and also showing the wire-guide by full lines in its intermediate position, by dotted lines in one extreme and by broken lines in the other extreme position; Fig. 4, a plan of the reel-shaft and roller detached; Fig. 5, a perspective of one end of the reel and reel-shaft secured together in a novel manner.

My improved device is shown as applied to a corn-planter of well-known construction, wherein the check-row bar A is arranged across the frame of the machine slightly in advance of the supporting-wheels B. A frame composed of side bars, C C, and cross-bars D D' is hinged by hooks $d$ and staples $a$ to the check-row bar A, and is located above and in advance of the left-hand planter-wheel. A shaft, E, is journaled to the swinging ends of the side bars, C, and carries a roller, F, located between the ends of said side bars, which roller bears and rests upon the wheel B. The projecting end $e$ of the shaft E passes freely through holes or bearings in the cross-arms F' of the reel F'', and the reel is securely held upon the shaft by means of a spider, G, provided with angular spurs $g$, which snugly fit the corners $f'$ at the intersection of the arms F', and also formed with a key-seat, $g'$, in its hub to receive a split key or pin, $e'$, which passes through the end of the shaft and holds the reel securely upon the shaft to turn therewith. The reel abuts against a collar, $e^2$, secured to the shaft E, and snugly fits between the collar and the pin $e'$, and is thereby prevented from moving longitudinally thereon and disengaging the key $e'$ from the seat $g'$ in the hub of the spider G.

The cross-bar D' of the frame is securely bolted to the side bars, C C, and projects beyond the outer bar to a point opposite the middle portion of the reel. The projecting end of the cross-bar D' provides a support for a swinging guide-bar, H, pivoted thereto at $h$, and provided at its upper end with an eye, $h'$, through which the check-row wire passes while being reeled up. The wire may be readily inserted into the eye of the swinging guide-bar H by means of an oblique slit, $h^3$, through the metal ring or eye $h'$, which will permit the wire to pass through it when twisted or bent out of its direct course through the eye, but not otherwise. The eye in the end of the swinging bar is of sufficient diameter to allow the tappets of the check-row wire to pass freely through it, and is held to swing in a path in front of and horizontally opposite the upper part of the reel.

The arc of movement of the swinging guide-lever is about equal to the width of the reel, and as it is moved back and forth in front of the reel the wire is wound smoothly and evenly in layers around the reel.

The guide-lever H may be operated by means of a flat metal bar, H', located horizontally beneath the frame C, and pivotally connected at its upturned outer end to the lower end of the lever H, and similarly connected at its flat horizontal end to the horizontally-swinging end of a hand-lever, H², pivotally connected by a pin, $h^2$, to the under side of the frame C. The free end of the hand-lever $H^2$ projects rearwardly to within convenient reach of the driver from his seat, and is moved horizontally to swing the guide-lever H across the path of the wire as it is wound upon the reel, as indicated by dotted lines in Fig. 3.

A foot pedal or stirrup, I, bolted securely to the inner side of the swinging end of the frame C, provides simple means for holding the friction-roller F with any required degree of pressure in contact with the rolling-surface of the planter-supporting wheel B, and thus increases the tension upon the wire, especially when reeling it up from the ground, to have it wound compactly and smoothly around the spool.

In reeling up the wire, the wire runs from the ground upwardly and through the eye of the guide-bar and over the top of the reel, and the reel is rotated to wind the wire thereon by the frictional contact of the roller F with the wheel B. In unreeling, the wire runs under the reel and directly to the ground without having to pass through the eye of the guide-bar, and the contact of the roller F with the wheel B will regulate the tension of the wire.

The wire is laid or unreeled before the planting is commenced and taken up after the planting is completed.

This reel attachment may be applied to or removed from the planter by disengaging the hooks $d$ from the staples $a$. By hinging the swinging frame directly to the check-row bar a simple connection to the check-row attachment is obtained, and no special fitting to the planter-frame will be required; and by locating the swinging frame and guide-arm relatively to each other, as described, the planter may be driven steadily in a direct course to conduct the wire properly to the reel.

I claim as my invention and desire to secure by Letters Patent—

1. The combination, with a corn-planter, of a reel for laying and taking up check-row wire, supported in a vertically-swinging frame hinged directly to the check-row bar of the planter, substantially as and for the purpose described.

2. In combination with a swinging frame, C, friction-roller F, planter-wheel B, and a check-row wire and reel, a check-row-wire guide, and a handle, $H^2$, and rod $H'$, by means of which said guide is operated, substantially as and for the purpose specified.

3. In combination with a swinging frame, C, friction-roller F, planter-wheel B, and a check-row wire and reel, a check-row-wire guide, a handle, $H^2$, and rod $H'$, by means of which said guide is operated, and a foot-treadle, I, by means of which the tension of the check-row wire may be adjusted, substantially as described, and for the purpose specified.

In testimony whereof I affix my signature in presence of two witnesses.

EUGENIO K. HAYES.

Witnesses:
FREDERIC E. DACK,
EDWIN N. REQUA.